United States Patent
Zheng

(10) Patent No.: US 7,986,649 B2
(45) Date of Patent: Jul. 26, 2011

(54) METHOD, APPARATUS AND SYSTEM FOR VIRTUAL NETWORK CONFIGURATION AND PARTITION HANDOVER

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/982,740

(22) Filed: Dec. 30, 2010

(65) Prior Publication Data
US 2011/0090819 A1  Apr. 21, 2011

Related U.S. Application Data

(63) Continuation of application No. 12/789,916, filed on May 28, 2010, which is a continuation of application No. PCT/CN2008/073250, filed on Nov. 28, 2008.

(30) Foreign Application Priority Data

Nov. 30, 2007 (CN) .......................... 2007 1 0077481

(51) Int. Cl.
*H04B 7/00* (2006.01)
*H04L 12/28* (2006.01)
*H04W 4/00* (2009.01)
*G06F 15/16* (2006.01)

(52) U.S. Cl. ........ 370/310; 370/254; 370/331; 370/338; 709/236

(58) Field of Classification Search .................. 370/310, 370/254
See application file for complete search history.

(56) References Cited

U.S. PATENT DOCUMENTS

| | | | |
|---|---|---|---|
| 5,751,967 A | 5/1998 | Raab et al. | |
| 7,136,374 B1 | 11/2006 | Kompella | |
| 7,469,298 B2 * | 12/2008 | Kitada et al. | 709/236 |
| 7,633,956 B1 | 12/2009 | Parandekar et al. | |
| 7,860,116 B2 | 12/2010 | Tadimeti et al. | |
| 2005/0180345 A1 * | 8/2005 | Meier | 370/310 |
| 2006/0067350 A1 | 3/2006 | Clevy et al. | |
| 2006/0227758 A1 | 10/2006 | Rana et al. | |
| 2007/0110077 A1 | 5/2007 | Takashige et al. | |

(Continued)

FOREIGN PATENT DOCUMENTS

CN 1697408 A 11/2005

(Continued)

OTHER PUBLICATIONS

MUSE IST—6th FP "Detailed Description of Residential Gateway and Advanced Features" Deliverable D TF3.2 ; May 12, 2005.*

(Continued)

*Primary Examiner* — Jeffrey Pwu
*Assistant Examiner* — Kodzovi Acolatse
(74) *Attorney, Agent, or Firm* — Conley Rose, P. C.; Grant Rodolph

(57) ABSTRACT

A method, apparatus and system for virtual network configuration and partition handover are provided. The virtual network configuration method includes the following steps: The serving edge device obtains a target virtual network identifier and a corresponding interface identifier, uses the target virtual network identifier and the corresponding interface identifier to generate a Layer-2 Control (L2C) protocol packet, and sends out the L2C protocol packet; the communication proxy device that receives the L2C protocol packet obtains the target virtual network identifier and the corresponding interface identifier from the L2C protocol packet, and sets up a mapping relation between a target virtual network and an interface.

7 Claims, 15 Drawing Sheets

U.S. PATENT DOCUMENTS

2007/0127414 A1* 6/2007 Sridhar et al. ............... 370/331
2009/0161677 A1 6/2009 Zheng

FOREIGN PATENT DOCUMENTS

| CN | 1777129 A    | 5/2006  |
|----|--------------|---------|
| CN | 1980170 A    | 6/2007  |
| EP | 1122914 A2   | 8/2001  |
| EP | 1318631 A2   | 6/2003  |
| JP | 2002111732   | 4/2002  |
| WO | 2005112350 A1| 11/2005 |

OTHER PUBLICATIONS

European Search and Examination Report; EP Application No. 08859282.9-1525; Oct. 12, 2010; 9 pgs.

PCT International Preliminary Report on Patentability; PCT Application No. PCT/CN2008/073250; Jun. 2, 2010; 7 pgs.

PCT International Search Report; PCT Application No. PCT/CN2008/073250; Mar. 5, 2009; 3 pgs.

Vasseur, JP, et al.; "A Per-domain path computation method for establishing Inter-domain Traffic Engineering (TE) Label Switched Paths (LSPs)"; draft-ietf-ccamp-inter-domain-pd-path-comp-03.txt; Aug. 29, 2006; 22 pgs.

Wadhwa, Sanjay, et al.; "GSMP extensions for layer2 control (L2C) Topology Discovery and Line Configuration"; draft-wadhwa-gsmp-l2control-configuration-00.txt; Jan. 20, 2006; 37 pgs.

Moy, J.; "OSPF Version 2"; RFC 2328; Apr. 1998; 194 pgs.

DSLForum2007.370.00; "L2C Multicast Wholesale Use Case"; Project WT-147; May 15, 2007; 6 pgs.

* cited by examiner

METHOD, APPARATUS AND SYSTEM FOR VIRTUAL NETWORK CONFIGURATION AND PARTITION HANDOVER

CROSS-REFERENCE TO RELATED APPLICATIONS

This application is a continuation of U.S. patent application Ser. No. 12/789,916, filed on May 28, 2010, which is a continuation of International Application No. PCT/CN2008/073250, filed on Nov. 28, 2008, which claims priority to Chinese Patent Application No. 200710077481.6, filed on Nov. 30, 2007, all of which are hereby incorporated by reference in their entireties.

FIELD

The present invention relates to network communication technologies, and in particular, to a method, apparatus, and system for virtual network configuration and partition handover.

BACKGROUND

Network providers provide Virtual Local Area Network (VLAN)/Virtual Private Network (VPN) connections for Service Providers (SPs) such as an Internet Service Provider (ISP) so that a user can be connected to the subscribed SP system through a corresponding VLAN/VPN transmission channel. However, to implement VLAN/VPN connections in a fixed access network, it is necessary to configure the relation between the VLAN/VPN ID and the user on the access network device.

In the process of implementing the present invention, the inventor finds that: The relation between the VLAN ID and the user on the fixed access network in the prior art is configured statically through the network management system of the access network itself, namely, configured before the user is connected. The configuration mode is defective in the following aspects:

1. When a nomadic user moves to a new network, because the new fixed access network has no VLAN ID corresponding to the nomadic user, the static configuration through the network management system of the new fixed access network does not support dynamic configuration of the nomadic or mobile user, and does not support the virtual network access of the nomadic or mobile user; and 2. When the user needs to be handed over from the same physical/virtual port to a new service/SP network dynamically, because the static configuration mode of the network management system does not support the dynamic configuration mode of the service/SP, the user cannot be handed over to the new service/SP network dynamically.

SUMMARY

A virtual network configuration method provided in an embodiment of the present invention includes the following: by a serving edge device, obtaining a target virtual network identifier and a corresponding interface identifier, using the target virtual network identifier and the corresponding interface identifier to generate a Layer-2 Control (L2C) protocol packet, and sending out the L2C protocol packet; and by a communication proxy device that receives the L2C protocol packet, obtaining the target virtual network identifier and the corresponding interface identifier from the L2C protocol packet, and setting up a mapping relation between a target virtual network and an interface.

A communication system provided in an embodiment of the present invention includes the following: a serving edge device, adapted to: obtain a target virtual network identifier and a corresponding interface identifier in an L2C protocol packet, generate an L2C protocol packet, and send the generated L2C protocol packet to an access network device; and a communication proxy device, adapted to: receive the L2C protocol packet, obtain the target virtual network identifier and the corresponding interface identifier from the L2C protocol packet, and set up a mapping relation between an interface corresponding to the interface identifier and a target virtual network.

A communication proxy apparatus provided in an embodiment of the present invention includes the following: a receiving unit, adapted to receive an L2C protocol packet that carries a target virtual network identifier and a corresponding interface identifier; an obtaining unit, adapted to parse the L2C protocol packet to obtain the target virtual network identifier and the corresponding interface identifier from the packet; a storing unit, adapted to: store information about a mapping relation between an interface and a virtual network, where the information about the mapping relation includes the virtual network identifier and the interface identifier; and a configuring unit, adapted to modify the information about the mapping relation in the storing unit according to the obtained target virtual network identifier and corresponding interface identifier.

Through the technical solution under the present invention, dynamic configuration of nomadic access is provided for nomadic users, and it is convenient for a user to perform handover from the virtual network of one service provision system to the virtual network of another service system.

DETAILED DESCRIPTION OF THE EMBODIMENTS

Figure 1:
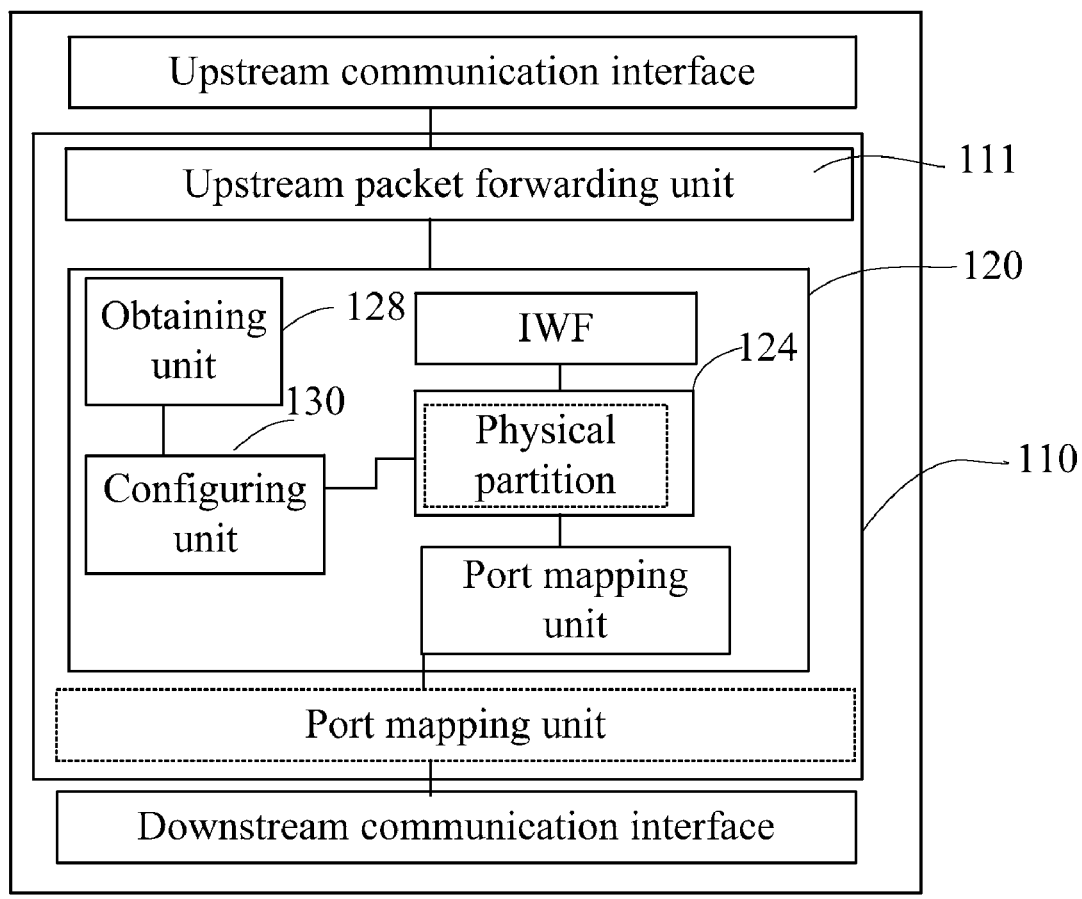
FIG. 1 shows a network communication device provided in an embodiment of the present invention.

First, the general embodiments of the present invention are described below.

A virtual network configuration method provided in an embodiment of the present invention includes the following: a serving edge device obtains a target virtual network identifier and a corresponding interface identifier, uses the target virtual network identifier and the corresponding interface identifier to generate an L2C protocol packet, and sends out the L2C protocol packet; a communication proxy device (a device on the access network, for example, an L2C proxy) that receives the L2C protocol packet obtains the target virtual network identifier and the corresponding interface identifier from the L2C protocol packet, and sets up a mapping relation between a target virtual network and an interface. Through the technical solution under the present invention, the virtual network interface parameter information can be configured dynamically, and then the packet between the access device and the service provision device is carried through the corresponding virtual network channel. Therefore, it is convenient to hand over the services for the nomadic users. The service handover of the user includes the service handover selected by the user, and the service handover selected by the service provision system.

In the process of authenticating the nomadic user, the serving edge device obtains the target virtual network identifier corresponding to the nomadic user and the interface identifier of the interface accessed by the nomadic user.

When the user selects a target service or is re-authenticated, the serving edge device obtains the target virtual network identifier selected by the user and the corresponding interface identifier.

When the target service provision device selects the target multicast virtual network for handover, the serving edge device obtains the target virtual network identifier and the corresponding interface identifier.

The communication proxy device deletes the physical interface corresponding to the interface identifier from the physical interface partition corresponding to the current virtual network identifier; and adds the physical interface to the physical interface partition corresponding to the target virtual network identifier. The physical interface partition in the context includes at least one physical interface.

The communication proxy device deletes the virtual interface corresponding to the interface identifier from the virtual interface partition corresponding to the current virtual network identifier; and modifies the information about the mapping relation between the physical interface partition corresponding to the target virtual network identifier and the virtual interface partition. The virtual interface of the context is an interface after the physical interface corresponding to the access device is mapped; the virtual interface partition includes at least one virtual interface. In the context, the reciprocally corresponding physical interface partition and virtual interface partition have corresponding physical interfaces and virtual interfaces. The mapping relation between the physical interface and the virtual interface may be a one-to-one relation or a many-to-one relation.

After the mapping relation between the target virtual network and the interface is set up, the communication proxy device returns an L2C protocol response packet, indicating that the configuration is complete.

The communication proxy device and the access device are set in the same physical entity; or the communication proxy device is set in an access convergence device, or the communication proxy device and the serving edge device are set in the same physical entity.

The interface is a physical port, and the information about the mapping relation between the target virtual network and the interface includes the target virtual network identifier and the corresponding physical port identifier; or The interface is a physical access circuit, and the information about the mapping relation between the target virtual network and the interface includes the physical access control information and the corresponding physical Access Circuit Identifier (ACI); or The interface is a virtual port, and the information about the mapping relation between the target virtual network and the interface includes a virtual target virtual network identifier and the corresponding virtual port identifier; or a virtual target virtual network identifier and the corresponding information about the mapping relation between the virtual port and the physical port; or The interface corresponding to the access device is a virtual access circuit, and the information about the mapping relation between the target virtual network and the interface includes virtual target access control information and the corresponding virtual ACI, or virtual target access control information and the corresponding information about the mapping relation between the virtual port and the physical port, where the virtual network may be a VLAN or a VPN.

Another virtual network partition handover method provided in an embodiment of the present invention includes the following: the communication proxy receives an L2C protocol packet, and obtains a target virtual network identifier and a corresponding interface identifier in the L2C protocol packet; the communication proxy device deletes the physical interface corresponding to the interface identifier from the physical interface partition corresponding to the current virtual network identifier; and adds the physical interface to the physical interface partition corresponding to the target virtual network identifier.

The physical interface may be a physical port and/or a physical access circuit, and the virtual network may be a VLAN and/or a VPN.

Another virtual network partition handover method provided in an embodiment of the present invention includes the following: the communication proxy receives an L2C protocol packet, and obtains a target virtual network identifier and a corresponding interface identifier in the L2C protocol packet; the communication proxy device deletes the virtual interface corresponding to the interface identifier from the virtual interface partition corresponding to the current virtual network identifier; and modifies the information about the mapping relation between the physical interface partition corresponding to the target virtual network identifier and the virtual interface partition.

The physical interface may be a physical port and/or a physical access circuit, and the virtual interface may be a virtual interface and/or a logical access circuit; and the virtual network may be a VLAN and/or a VPN.

A communication system provided in an embodiment of the present invention includes: a serving edge device, adapted to: obtain a target virtual network identifier and a corresponding interface identifier in an L2C protocol packet, generate an L2C protocol packet, and send the generated L2C protocol packet to an access network device; and a communication proxy device, adapted to: receive the L2C protocol packet, obtain the target virtual network identifier and the corresponding interface identifier from the L2C protocol packet, and set up a mapping relation between an interface corresponding to the interface identifier and a target virtual network.

A communication proxy apparatus (L2C proxy) is provided in an embodiment of the present invention. As shown in FIG. 1, the L2C proxy 110 includes: a receiving unit (for example, an upstream packet forwarding unit 111), adapted to receive an L2C protocol packet that carries a target virtual network identifier and a corresponding interface identifier; an obtaining unit (for example, the obtaining unit 128 in FIG. 1), adapted to parse the L2C protocol packet to obtain the target virtual network identifier and the corresponding interface identifier from the packet; a storing unit (for example, the storing unit 124 in FIG. 1), adapted to: store information about a mapping relation between an interface and a virtual network, where the information about the mapping relation includes the virtual network identifier and the interface identifier; and a configuring unit (for example, the configuring unit 130 in FIG. 1), adapted to modify the information about the mapping relation in the storing unit according to obtained target virtual network identifier and corresponding interface identifier.

The storing unit records at least one mapping relation partition information unit, and each mapping relation partition information unit corresponds to a virtual network, and records the virtual network identifier and the corresponding interface partition information. The configuring unit deletes the interface information corresponding to the interface identifier from the mapping relation partition information unit corresponding to the current virtual network identifier, and adds the interface information corresponding to the interface identifier to the mapping relation partition information unit corresponding to the target virtual network identifier.

The interface is a physical interface, and the mapping relation partition information unit records a virtual network identifier and the corresponding physical interface information; or The interface is a virtual interface, and the mapping relation partition information unit records a logical virtual network identifier and the corresponding mapping relation between the virtual interface and the physical interface.

The communication proxy apparatus further includes: a port mapping unit, adapted to perform conversion between the physical interface and the logical port for the received packet according to the information about the mapping relation between the physical interface and the virtual interface.

The communication proxy apparatus further includes: a matching unit, adapted to: check whether the target virtual network identifier matches the current virtual network identifier; and, if they do not match, notify the configuring unit to start configuration.

Note that the communication proxy apparatus (L2C proxy) in the context may be set in an access convergence device of the access network, or set in an access node, for example, a Digital Subscriber Line Access Multiplexer (DSLAM) of a Digital Subscriber Line (DSL) system. The virtual network may be a VLAN (virtual networks include multicast VLANs), or a VPN. The communication proxy device uses a Layer 2 Control Protocol (L2CP) to control plenty of access nodes under it through an IP edge node such as a Broadband Remote Access Server (BRAS) or a Broadband Network Gateway (BNG). The communication proxy apparatus (L2C Proxy) is capable of topology discovery, line configuration, line test, and multicast control. The L2C proxy performs physical partitioning for the physical interfaces (for example, physical ports of the DSL, multicast access circuits) of the DSLAM according to the SP (for example, the ISP) or access network. The L2C proxy introduces "port mapping units", including "virtual partition list" and "port mapping function". The "virtual partition list" is mapped according to the ISP or access network. The one-to-one mapping relation between the "virtual partition list" and the "physical partition list" is accessed and managed by the corresponding ISP through an Interworking Function (IWF) unit by means of L2C messages, and the L2C messages are filtered, detected, converged and forwarded. The IWF may filter, detect, converge and forward the L2C messages according to the ISP or access network, including: receiving the packet from the ISP, determining the corresponding access network according to the ISP that sends the packet, and forwarding the received packet to the access network; receiving the packet from the access network, determining the corresponding ISP according to the access network that sends the packet, and forwarding the received packet to the ISP. Therefore, it is necessary to save the mapping relation between the ISP and the access network on the IWF, and maintain the peer information on the access network and the ISP respectively, for example, maintain the physical port information of the access network on the ISP so that the ISP can transmit information to the corresponding access network.

A network communication device provided in an embodiment of the present invention includes: a communication interface, adapted to communicate with other network communication devices, and receive and send packets.

The network communication devices include the communication proxy apparatus mentioned above.

The communication network device is a DSL access device, or an access convergence device, or a broadband access server, or a broadband border gateway.

Figure 2:
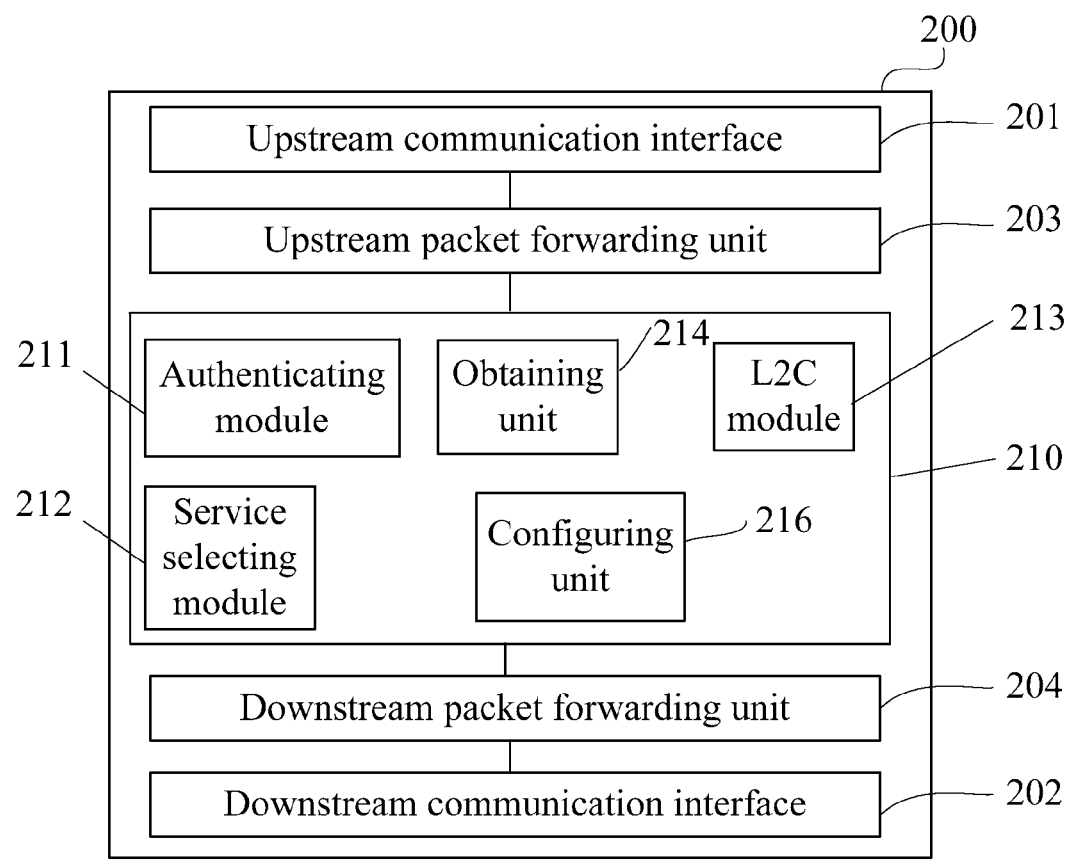
FIG. 2 shows a serving edge device provided in an embodiment of the present invention.

FIG. 2 shows another serving edge device 200 provided in an embodiment of the present invention. The serving edge device 200 includes an upstream communication interface 201, a downstream communication interface 202, an upstream packet forwarding unit 203 and a downstream packet forwarding unit 204.

The upstream communication interface 201 is connected to a service provision device, and the downstream communication interface 202 is connected to an access convergence device or an access device.

The downstream packet forwarding unit 204 is adapted to receive and send the packet from the access device through the downstream communication interface 202. The upstream packet forwarding unit 203 is adapted to receive and send the packet from the service provision device through the upstream communication interface 201.

Through a service selecting module 212 or an L2C protocol module 213, the obtaining module 214 may obtain the target virtual network identifier and the interface identifier corresponding to the access device from the packet exchanged between the upstream packet forwarding unit 203 and the downstream packet forwarding unit 204. The obtaining module 214 may also obtain the virtual network identifier dynamically (not illustrated in the figure).

The configuring unit 216 uses the information obtained by the obtaining unit to generate an L2C protocol packet, and sends the generated packet to the corresponding device through the downstream packet forwarding unit 204.

Optionally, the serving edge device 200 may include an authenticating module 211 which authenticates the user who attempts to access the service provision device or select a handover service.

First Embodiment

Figure 3:
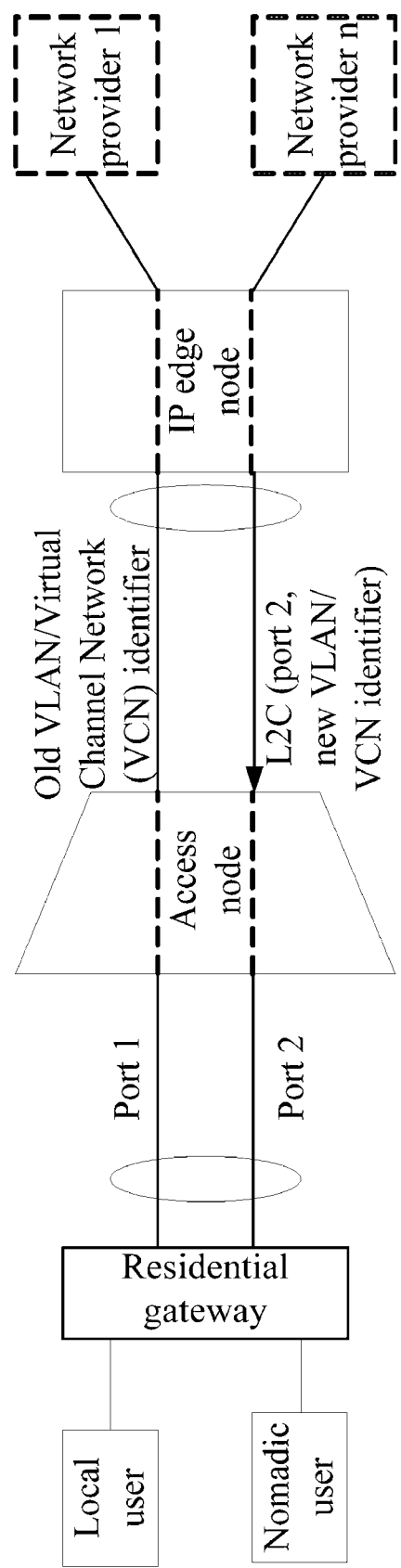
FIG. 3 shows a nomadic scenario provided in an embodiment of the present invention.

The application scenario of the first method of the present invention is a nomadic scenario, as shown in FIG. 3.

Each user corresponds to a port, which is either a physical port or a virtual port. The port may be sorted by: physical line such as DSL and Virtual Channel (VC), by layer-2 information (for example, VLAN ID, Ethernet priority, media access control (MAC) address), or by quintuplet information (for example, source IP address, destination IP address, source port, destination port, and protocol type).

As shown in FIG. 3, a local user accesses the network through port 1, and the mapping relation between port 1 corresponding to the local user and the VLAN/VPN ID1 is already configured on the access network. Therefore, the local user accesses the network from the corresponding port 1. The access network maps port 1 to the corresponding layer-2 VLAN or VPN channel according to the mapping relation, and port 1 is connected to the access network.

As shown in FIG. 3, the nomadic user accesses the network through port 2. No mapping relation between port 2 corresponding to the nomadic user and the VLAN/VPN ID2 is configured on the access network. In this case, the IP edge node (such as the BNG and BRAS) delivers the mapping relation between port 2 corresponding to the nomadic user and the VLAN/VPN ID2 to the access network dynamically through an L2C mechanism. Therefore, the nomadic user accesses the network through the corresponding port 2, and the access network may map port 2 to the corresponding VLAN or VPN channel according to the obtained mapping relation between port 2 and the VLAN/VPN ID2, and port 2 is connected to the access network.

Figure 4:
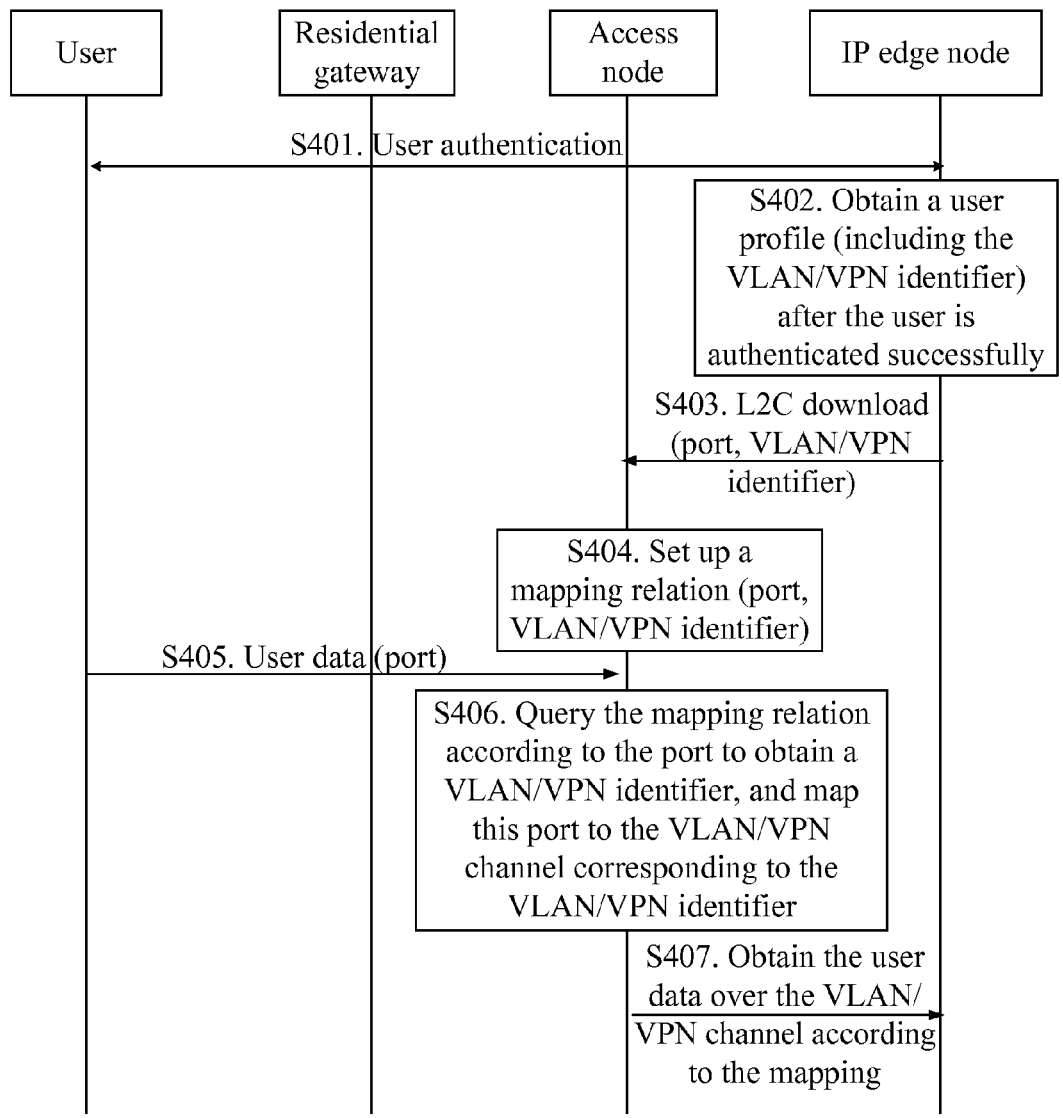
FIG. 4 is a flowchart of a nomadic scenario provided in an embodiment of the present invention.

As shown in FIG. 4, the detailed process is as follows:

Step S401: The nomadic user is authenticated through an IP edge.

The IP edge may obtain the port corresponding to the nomadic user from the authentication process. For example, the access network may provide the intermediate relay function, and the port information corresponding to the nomadic user is inserted into the Point to Point Protocol over Ethernet (PPPoE) tag or Dynamic Host Configuration Protocol (DHCP) Option.

Step S402: After the nomadic user is authenticated successfully, the IP edge obtains the profile of the nomadic user from the authentication result. The profile includes a VLAN/VPN ID. The VLAN/VPN ID may be a completely new ID allocated dynamically; and the VLAN ID may be a customer tag (C-Tag), a service tag (S-Tag), or a combination thereof.

Step S403: The IP edge binds the port corresponding to the nomadic user to the VLAN/VPN ID, sets up a mapping relation between the port and the VLAN/VPN ID, and delivers the mapping relation to the corresponding access network dynamically through the L2C protocol.

Step S404: The access network receives the L2C protocol packet from the IP edge, parses the packet to obtain the mapping relation between the port and the VLAN/VPN ID, and records the mapping relation.

Step S405: The nomadic user sends a user data packet through the corresponding port. The data packet includes port information.

Step S406: The access network queries the list of mapping relations between the port and the VLAN/VPN ID according to the port information in the data packet, obtains the VLAN/VPN ID corresponding to the port, and maps the port to the VLAN/VPN channel corresponding to the VLAN/VPN ID.

Step S407: The user data over the VLAN/VPN channel is obtained according to the mapping, and the user accesses the network.

Second Embodiment

Figure 5:
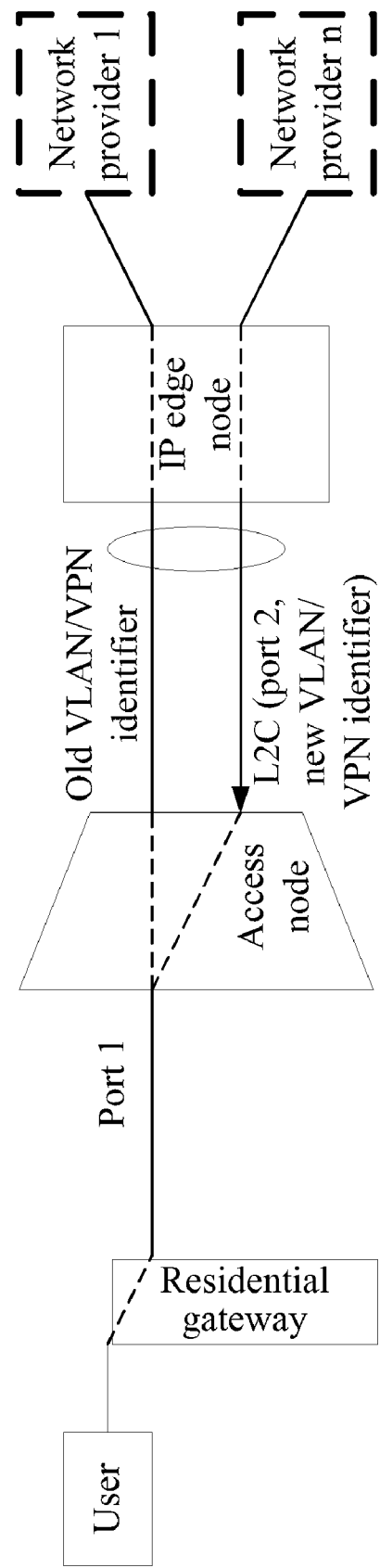
FIG. 5 shows a first service/SP handover scenario provided in an embodiment of the present invention.

The second embodiment of the present invention provides a service/SP handover scenario, as shown in FIG. 5.

Each user corresponds to a port, and the mapping relation between the port corresponding to the user and the VLAN/VPN ID is already configured on the access network. After the user accesses the network through port 1, the user may query the mapping relation to obtain the corresponding VLAN/VPN ID according to the information about port 1. In this way, port 1 is mapped to the layer-2 VLAN or VPN channel of the corresponding service/SP, and the user accesses the corresponding service or SP network.

When the user needs to be handed over from the same port 1 to a new service/SP network dynamically, because no mapping relation between port 1 corresponding to the user and the new VLAN/VPN ID is configured on the access network, the IP edge obtains such a mapping relation dynamically through an L2C mechanism, and delivers the obtained mapping relation to the corresponding access network. The access network receives and records the new mapping relation delivered by the IP edge. In this way, after the user accesses the network from the same port 1, the service of port 1 is mapped to the corresponding layer-2 VLAN or VPN channel of the corresponding service/SP under the new mapping relation, and the user accesses the corresponding service or SP network.

Figure 6:
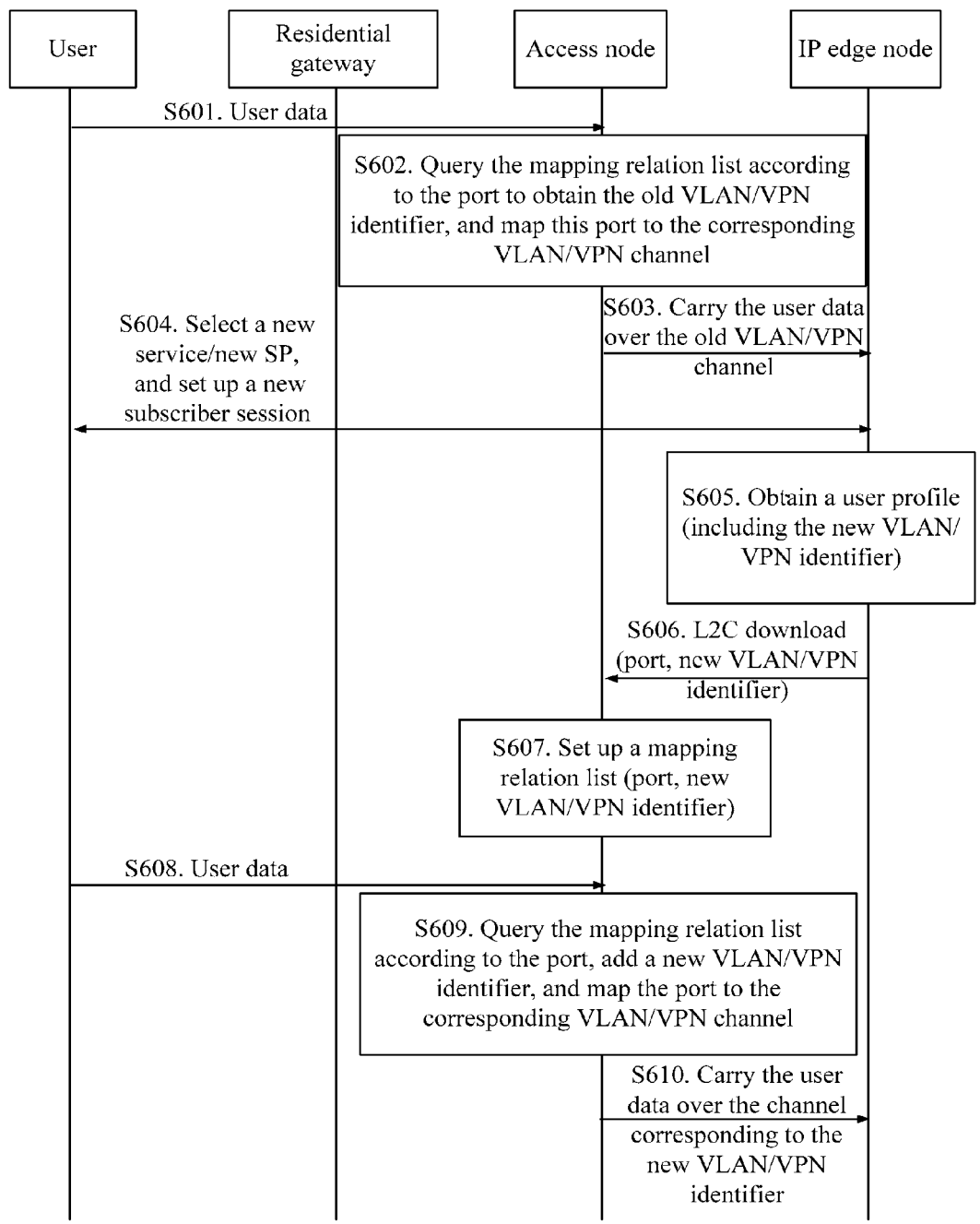
FIG. 6 is a flowchart of a service/SP handover scenario provided in an embodiment of the present invention.

As shown in FIG. 6, the process in this embodiment includes the following steps:

Step S601: Before being handed over to the new service/SP network, the user sends user data through the corresponding port 1.

Step S602: The access network parses the received user data packet to obtain the corresponding port, and, based on the port information obtained from the parsed packet, searches the list of mapping relations between the port and the VLAN/VPN ID to obtain the VLAN/VPN ID of the old service/SP corresponding to the port.

Step S603: The access network maps the service of port 1 to the VLAN/VPN ID channel of the old service (or old SP) corresponding to port 1. The VLAN/VPN channel of the old service (or old SP) carries the user data. In this way, the user accesses the old service or old SP network.

Step S604: The user selects a new service/SP network. Optionally, the user needs to undergo a new user authentication process to set up a new subscriber session.

Step S605: The IP edge obtains a user profile while the user selects the service/SP. The user profile includes the VLAN/VPN ID of the new service (or new SP). The VLAN/VPN ID may be a wholly new ID allocated dynamically, and the VLAN ID may be an S-Tag.

Step S606: Through the L2C protocol, the IP edge delivers the new mapping relation between the port corresponding to the user and the VLAN/VPN ID of the new service (or new SP) to the corresponding access network.

Step S607: The mapping relation between the corresponding port 1 and the VLAN/VPN ID is set up or updated on the access network.

Step S608: The user sends the user data through the corresponding port.

Step S609: After the access network receives the user data packet, based on the port information in the data packet, the access network searches the list of mapping relations between the port and the VLAN/VPN ID to obtain the VLAN/VPN ID of the new service (or new SP) corresponding to port 1. The access network maps the service of this port to the VLAN/VPN channel of the new service (or new SP).

Step S610: The VLAN/VPN channel of the new service (or new SP) carries the user data. In this way, the user accesses the new service or new SP network.

Third Embodiment

In a multicast wholesale scenario, the retailer SP configures the Access Control List (ACL) of the same DSLAM through a BNG by means of different L2C connections. The IWF is designed for the IP edge node to perform layer-2 control for the access node. As shown in Table 1, the basic structure of the ACL includes: ACI, multicast address, multicast source address (optional), and ACL attribute. The ACI is also known as an Access Loop Identifier (ALI), for example, the physical port corresponding to the DSL.

TABLE 1

Basic structure of an ACL

| ACI | Multicast Address | Multicast Source Address | ACL Attribute |
|---|---|---|---|
| Physical ACI 1 | 224.x.y.z | a.b.c.d | >allowed |
| | 224.x1.y1.z1 | a1.b1.c1.d1 | >not allowed |
| Physical ACI 2 | ... | | |

Figure 7:
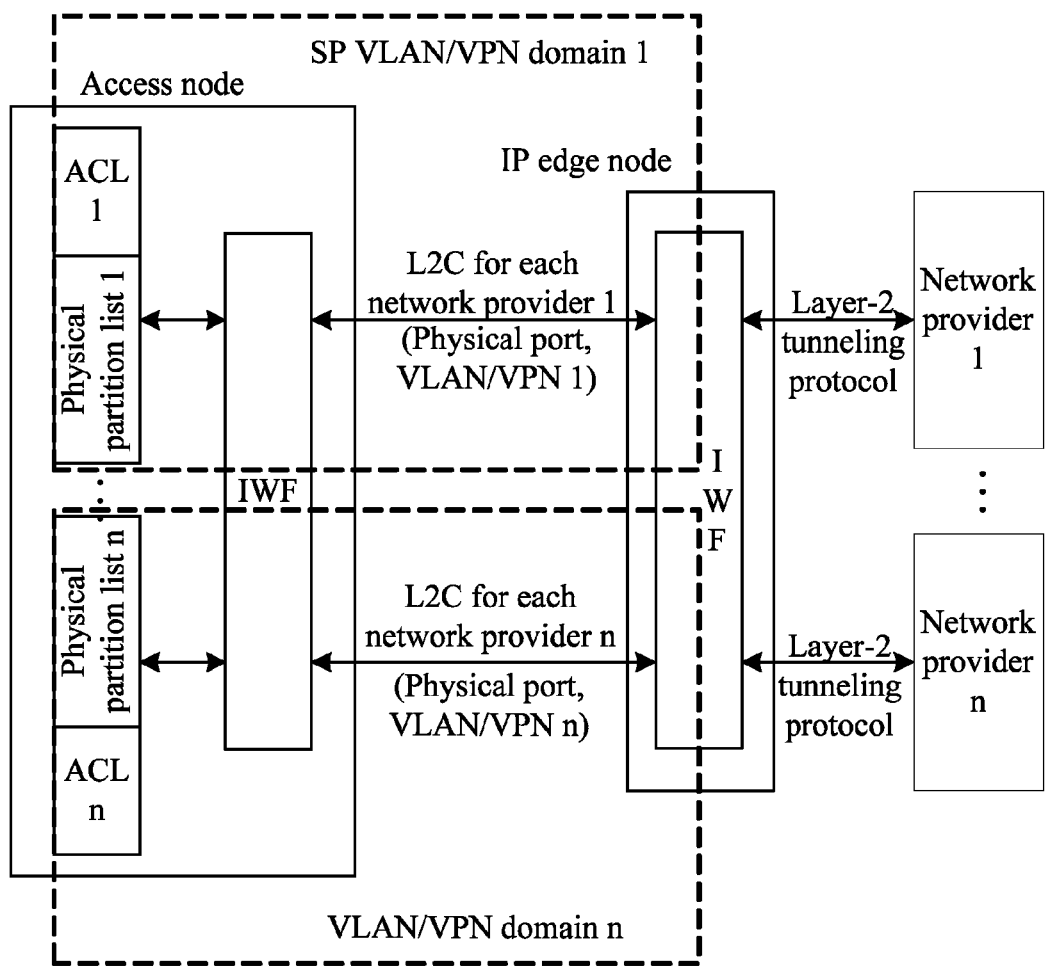
FIG. 7 shows a second service/SP handover scenario provided in an embodiment of the present invention.

The third embodiment of the present invention provides a second service/SP handover scenario, as shown in FIG. 7.

The domain between the access node and the IP edge node forms the VLAN/VPN domain of the service/SP, and each different service/SP has a different VLAN/VPN. In this embodiment, a physical partition list can be divided on the access node according to the ISP, and a multicast physical ACL can be divided on the access node according to the ISP. The physical partition list divided according to the ISP corresponds to the multicast physical ACL uniquely. Alternatively, the physical ACL is not divided on the access network, namely, only one physical ACL exists on the access node and includes all physical ACIs instead of being divided according to the ISP.

In this embodiment, a virtual network partition handover method includes: A communication proxy device of an access device or an IP edge receives an L2C protocol packet, and obtains the target virtual network identifier (the identifier of the virtual network that requires partition handover) in the L2C protocol packet and the corresponding interface identifier (physical interface identifier, for example, the ACI in the physical port and the multicast VLAN). The communication proxy device deletes the physical interface corresponding to the interface identifier from the physical interface partition corresponding to the current virtual network identifier; and adds the physical interface information to the physical interface partition corresponding to the target virtual network identifier, where the physical interface partition includes at least one physical interface.

Figure 8:
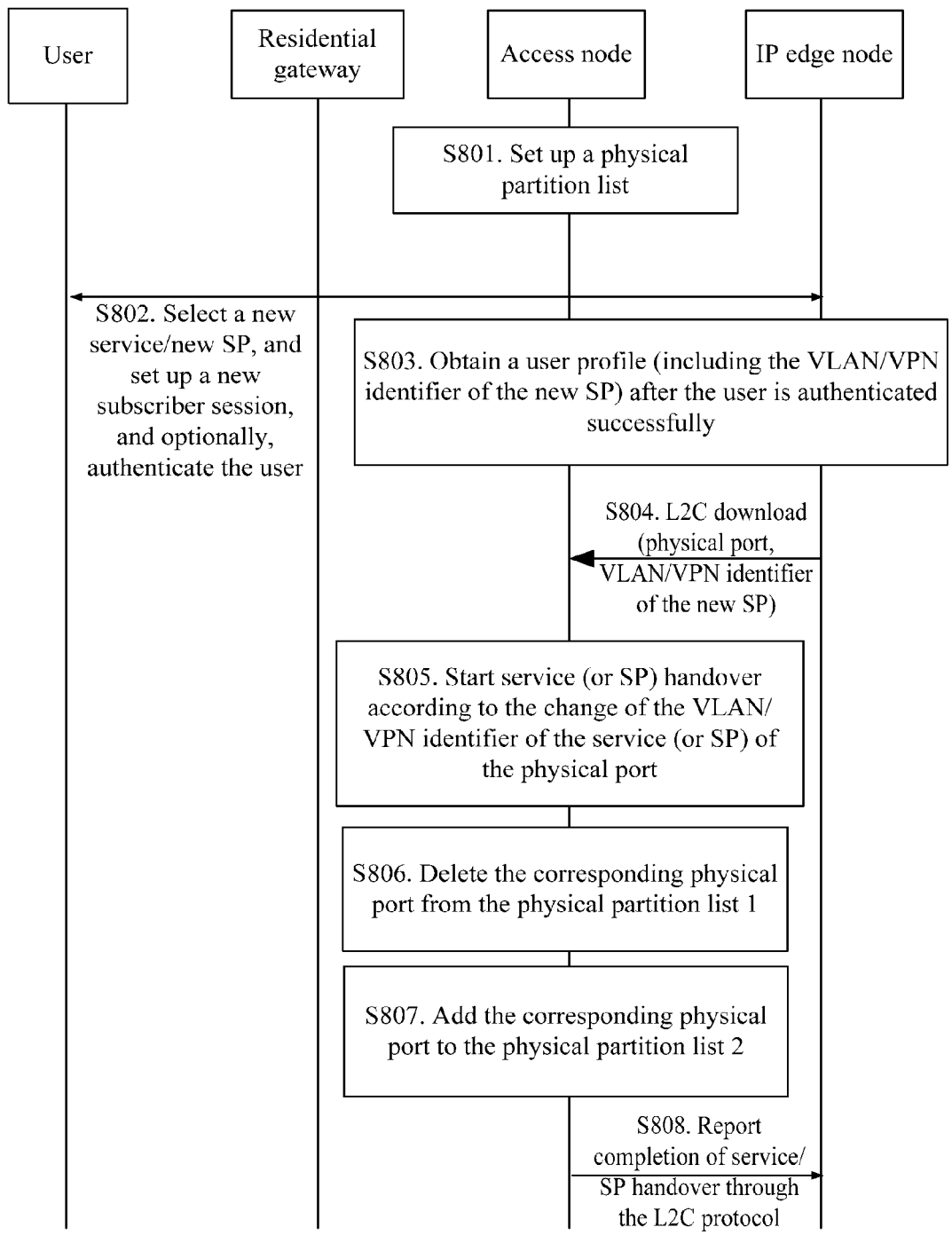
FIG. 8 is a service/SP handover flowchart of a physical partition list in an embodiment of the present invention.

The service/SP handover process of the physical partition list is shown in FIG. 8.

Step S801: Before handover to the new service/SP network, a physical partition list is already set up on the access node. The physical partition list is divided according to the ISP, and the physical port corresponding to the user belongs to physical partition list 1.

Step S802: The user selects a new service/SP network (such as ISP2). Optionally, the user needs to undergo a new user authentication process to set up a new subscriber session.

Step S803: The IP edge obtains a user profile while the user selects the service/SP. The user profile includes the VLAN/VPN ID of the new service (or new SP). The VLAN/VPN ID may be a wholly new ID allocated dynamically, and the VLAN ID may be an S-Tag.

Step S804: Through the L2C protocol, the IP edge delivers the new mapping relation between the physical port corresponding to the user and the VLAN/VPN ID of the new service (or new SP) to the corresponding access network.

Step S805: The access network queries the corresponding list of mapping relations between the physical port and the VLAN/VPN ID. If the mapping relation between the physical port and the VLAN/VPN ID changes, the access network starts handover of the service/SP.

Step S806: The access network deletes the corresponding physical port delivered by the L2C protocol in S804 from the physical partition list 1.

Step S807: According to the service/SP corresponding to the VLAN/VPN ID of the new service/SP, the corresponding physical port delivered through the L2C in S804 is added to the corresponding physical partition list (for example, physical partition list 2).

Step S808: The access network reports completion of the service/SP handover to the IP edge through the L2C protocol.

Figure 9:
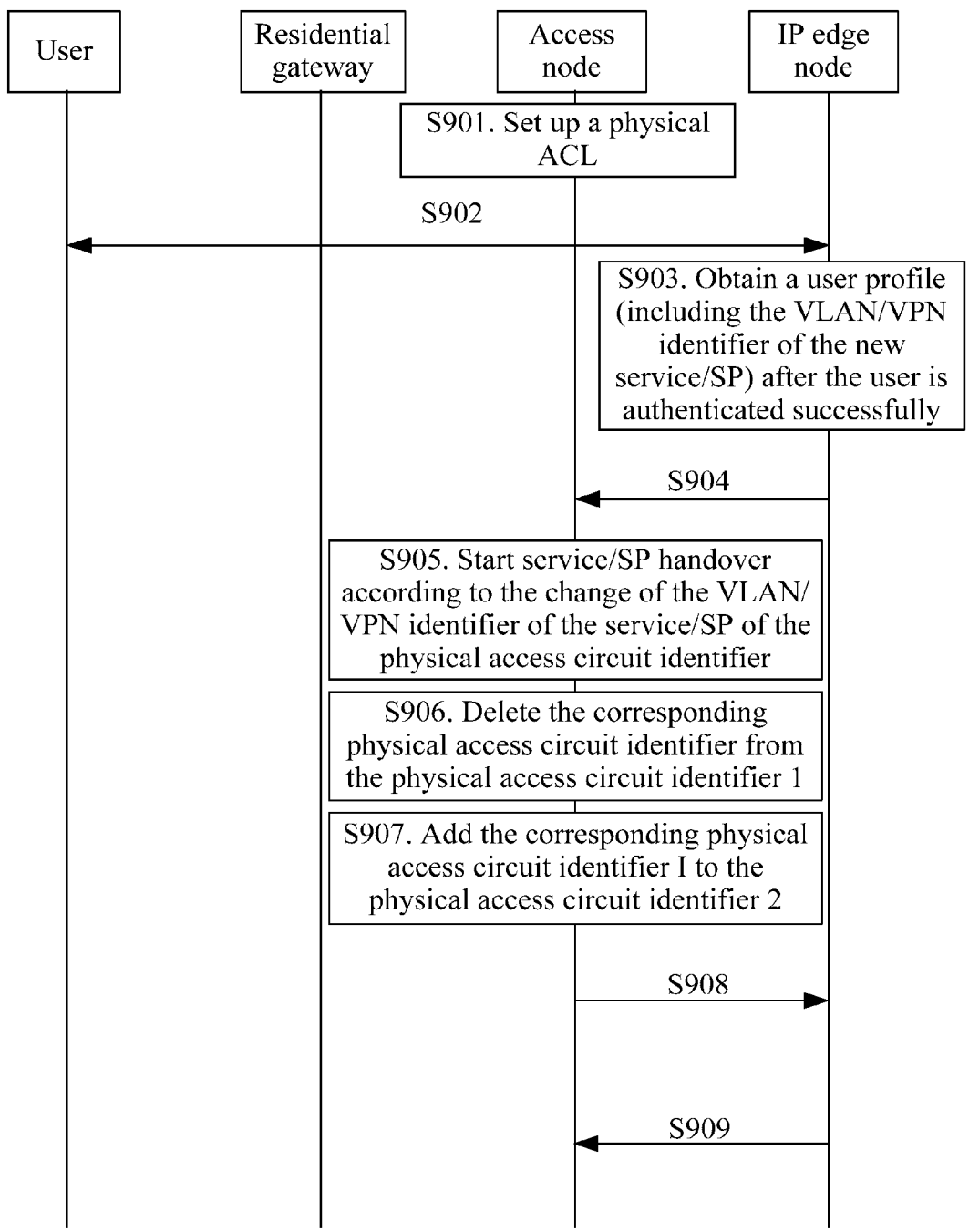
FIG. 9 is a service/SP handover flowchart of a physical ACL in an embodiment of the present invention.

The service/SP handover process of the physical ACL is shown in FIG. 9.

Step S901: Before handover to the new service/SP network, a physical ACL divided according to the ISP is already set up on the access network. The physical ACI corresponding to the user belongs to physical ACL 1.

Step S902: The user selects a new service/SP network (such as ISP2). Optionally, the user needs to undergo a new user authentication process to set up a new subscriber session.

Step S903: The IP edge obtains a user profile while the user selects the service/SP. The user profile includes the VLAN/VPN ID of the new service (or new SP). The VLAN/VPN ID may be a wholly new ID allocated dynamically, and the VLAN ID may be an S-Tag.

Step S904: Through the L2C protocol, the IP edge delivers the new mapping relation between the physical ACI corresponding to the user and the VLAN/VPN ID of the new service (or new SP) to the corresponding access network.

Step S905: The access network queries the corresponding list of mapping relations between the physical ACI and the VLAN/VPN ID. If the mapping relation between the physical ACI and the VLAN/VPN ID changes, the access network starts handover of the service/SP.

Step S906: The access network deletes the corresponding physical ACI delivered through the L2C protocol in S904 from the physical ACI 1.

Step S907: According to the service/SP corresponding to the VLAN/VPN ID of the new service/SP, the access network adds the corresponding physical ACI delivered through the L2C protocol in S904 to the corresponding physical ACI (for example, the physical ACI 2).

Step S908: The access network reports completion of the service/SP handover to the IP edge through the L2C protocol.

Step S909: Through the L2C protocol, the IP edge configures the multicast address and the ACL attribute of the physical ACI newly added in the physical ACI 2 of the access network.

Fourth Embodiment

Figure 10:
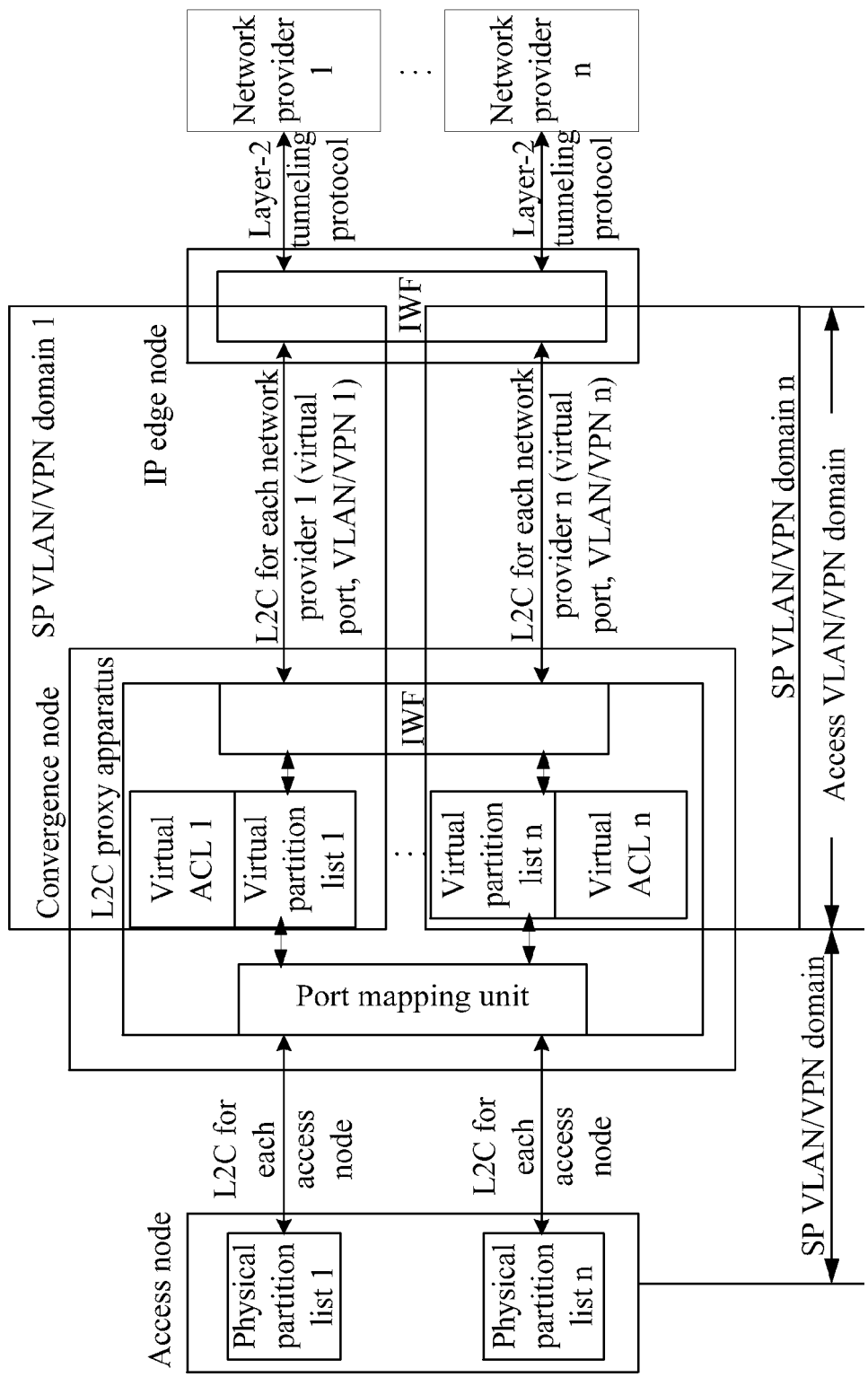
FIG. 10 shows a third service/SP handover scenario provided in an embodiment of the present invention.

The fourth embodiment of the present invention provides a third service/SP handover scenario, as shown in FIG. 10.

Based on the L2C proxy, the VLAN/VPN domain between the access network and the IP edge is divided into a first VLAN/VPN domain and a second VLAN/VPN domain. That is, the domain between the access network and the L2C proxy is the first VLAN/VPN domain (namely, the access VLAN/VPN domain), and the domain between the L2C proxy and the IP edge is the second VLAN/VPN domain (namely, the VLAN/VPN domain of the service/SP). Each different service/SP has a different VLAN/VPN. The L2C proxy records the virtual partition list divided according to the ISP. This virtual partition list records the information about the mapping relations between the virtual port and the VLAN/VPN ID. Besides, the virtual partition list can be divided according to the ISP and recorded on the L2C proxy, and the multicast logical ACL can be divided according to the ISP on the access node. The virtual partition list divided according to the ISP is similar to the multicast virtual ACL. It is appropriate if only one virtual ACL exists on the access node, and this virtual ACL includes all virtual ACIs and is not divided according to the ISP. In the case of service/SP handover, only the virtual partition list needs to be handed over, and the physical partition list on the access node may keep unchanged, or even no physical partition list exists on the access node and the virtual partition list on the L2C proxy works instead to implement the wholesale.

Figure 11:
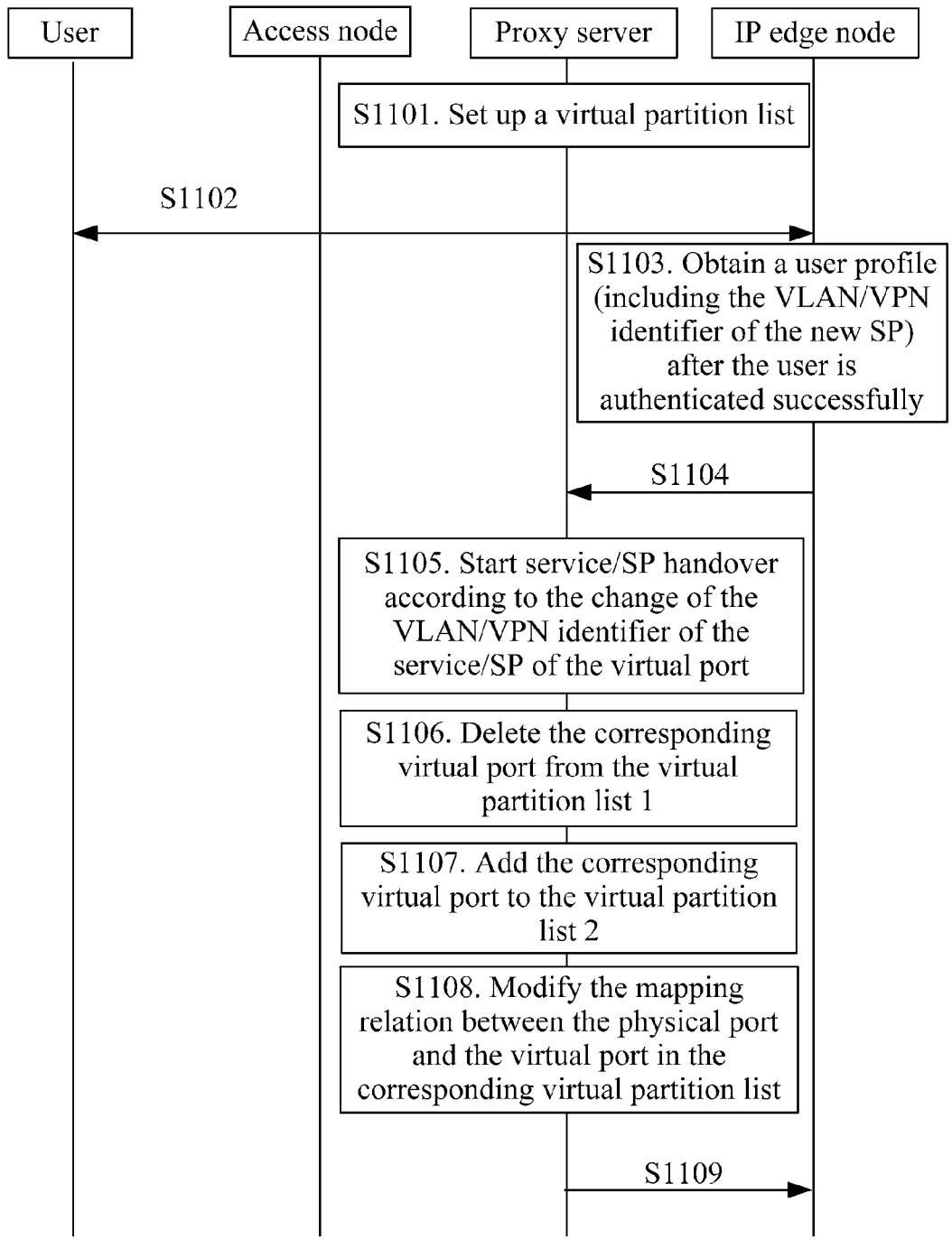
FIG. 11 is a service/SP handover flowchart of a logical partition list in an embodiment of the present invention.

The service/SP handover process of the virtual partition list is shown in FIG. 11.

Step S1101: Before handover to the new service/SP network, a virtual partition list is already set up on the access network. The virtual partition list is divided according to the ISP, and the virtual port corresponding to the user belongs to virtual partition list 1.

Step S1102: The user selects a new service/SP network (such as ISP2). Optionally, the user needs to undergo a new user authentication process to set up a new subscriber session.

S1103-S1107 are similar to S803-S807. The difference is that the physical port and the physical partition list in FIG. 8 change to the virtual port and virtual partition list in FIG. 11.

Step S1108: The access network modifies the port mapping list in the port mapping unit, and updates the mapping relation between the physical port and the virtual port in the virtual port partition list. In this embodiment, "mapping relation between the physical port and the virtual port of the virtual partition list 1" is modified to "mapping relation between the physical port and the virtual port of the virtual partition list 2".

Step S1109: This step is the same as S808 in FIG. 8.

Figure 12:
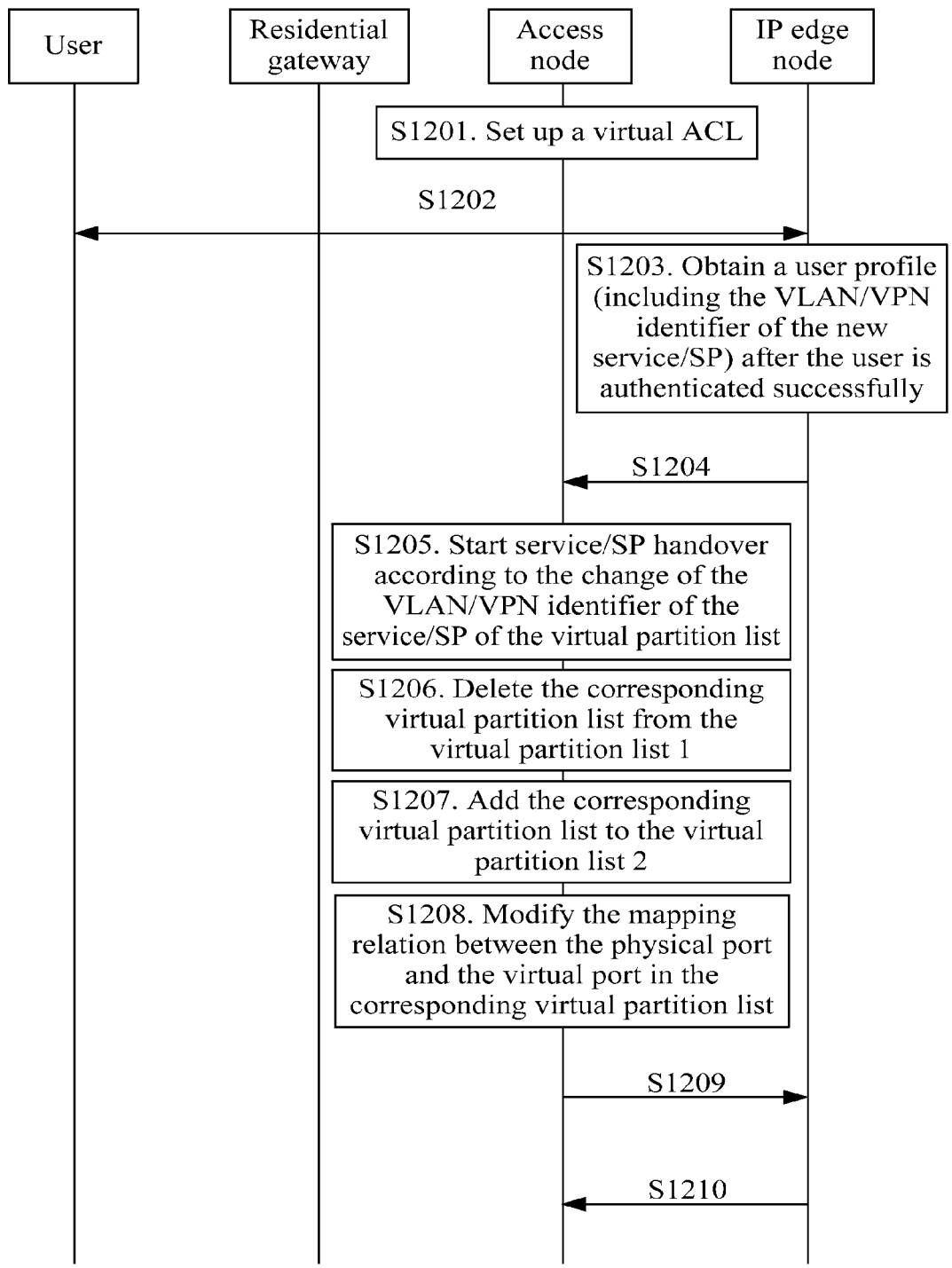
FIG. 12 is a service/SP handover flowchart of a physical ACL in an embodiment of the present invention.

Similar to FIG. 9, FIG. 12 shows a service/SP handover process of the virtual ACL.

Step S1201: The difference between FIG. 9 and FIG. 12 is that the physical ACI and the physical ACL in FIG. 9 change to the virtual ACI and virtual ACL in FIG. 12.

Step S1202-1203 are the same as S902-903.

Step S1204-1207: The difference between S1204-1207 and S904-907 is that the physical ACI and the physical ACL in S904-907 change to the virtual ACI and virtual ACL in this embodiment.

Step S1208: The access network modifies the port mapping list in the port mapping unit, and updates the mapping relation between the physical ACI and the virtual ACI in the virtual ACL. In this embodiment, "mapping relation between the physical ACI and the virtual ACI of the virtual ACL 1" is modified to "mapping relation between the physical ACI and the virtual ACI of the virtual ACL 2".

Step S1209 is the same as S908.

Step S1210: The difference between S1210 and S909 is that the physical ACI and the physical ACL in S909 change to the virtual ACI and virtual ACL in S1210.

Figure 13:
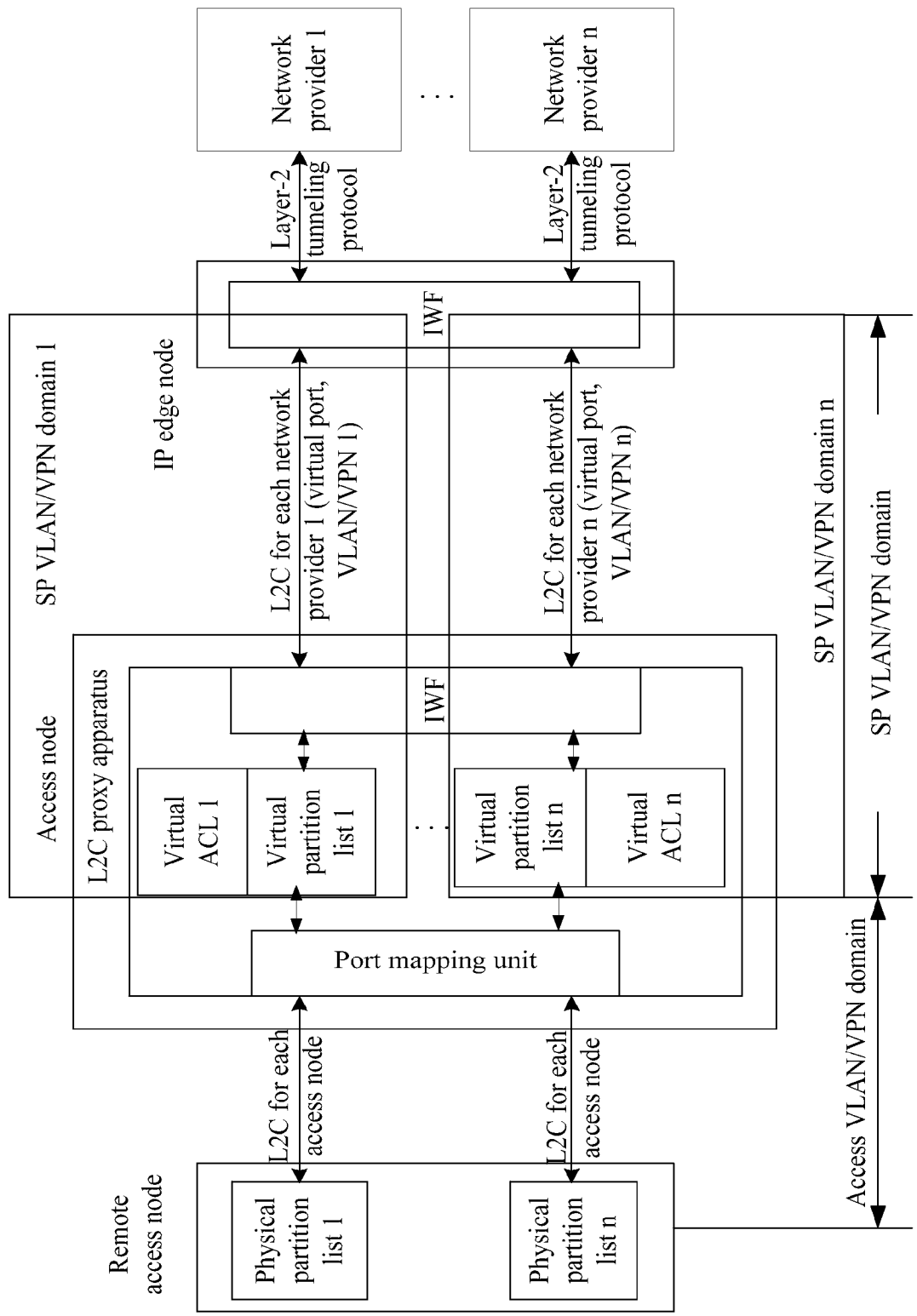
FIG. 13 shows a fourth service/SP handover scenario provided in an embodiment of the present invention.

The fourth method application scenario of the present invention is a fourth service/SP handover scenario, as shown in FIG. 13. FIG. 13 differs from FIG. 10 in that: A remote access network is introduced, and the L2C proxy is located on the remote access network. The process is the same.

Figure 14:
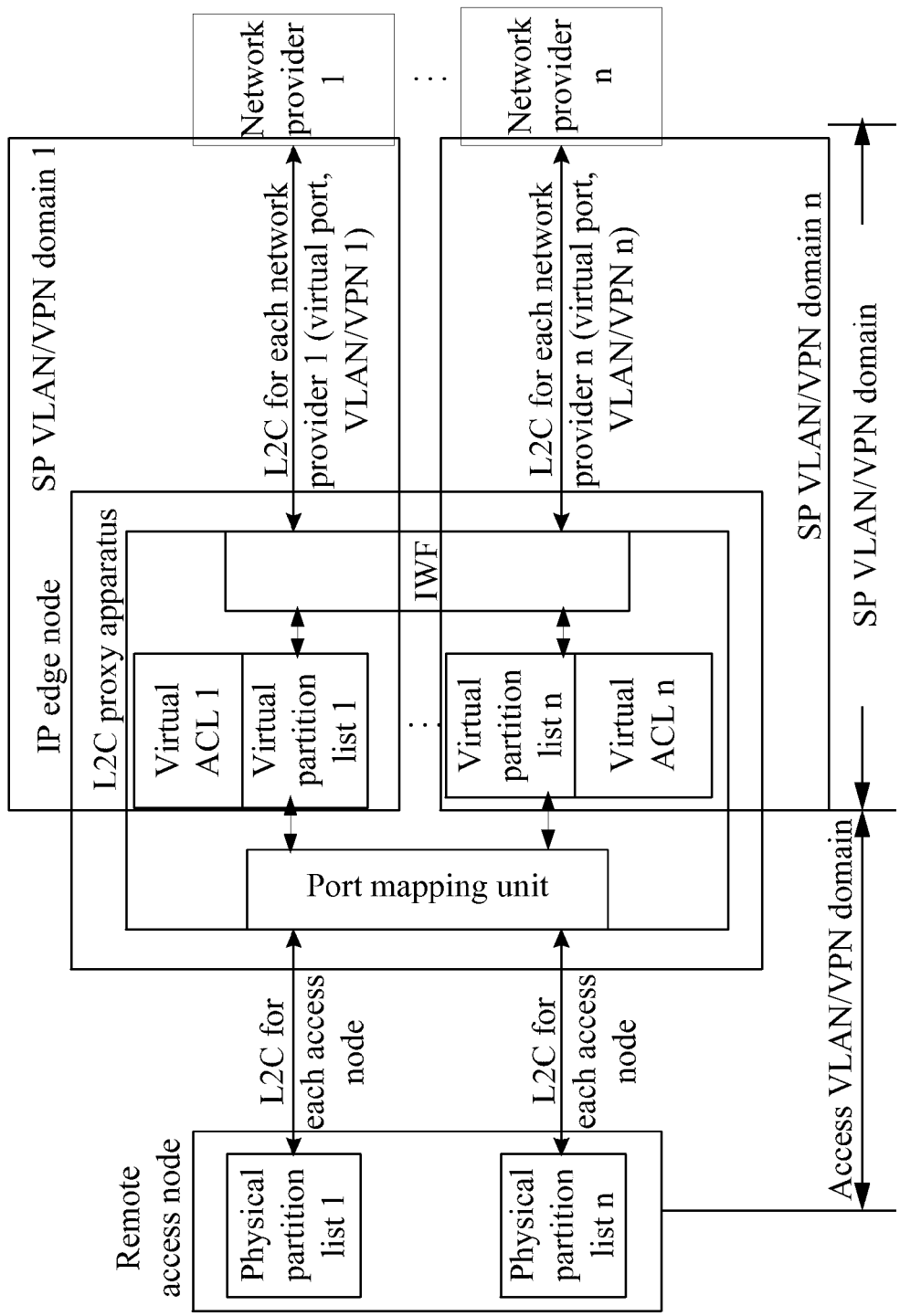
FIG. 14 shows a fifth service/SP handover scenario provided in an embodiment of the present invention.
Figure 15:
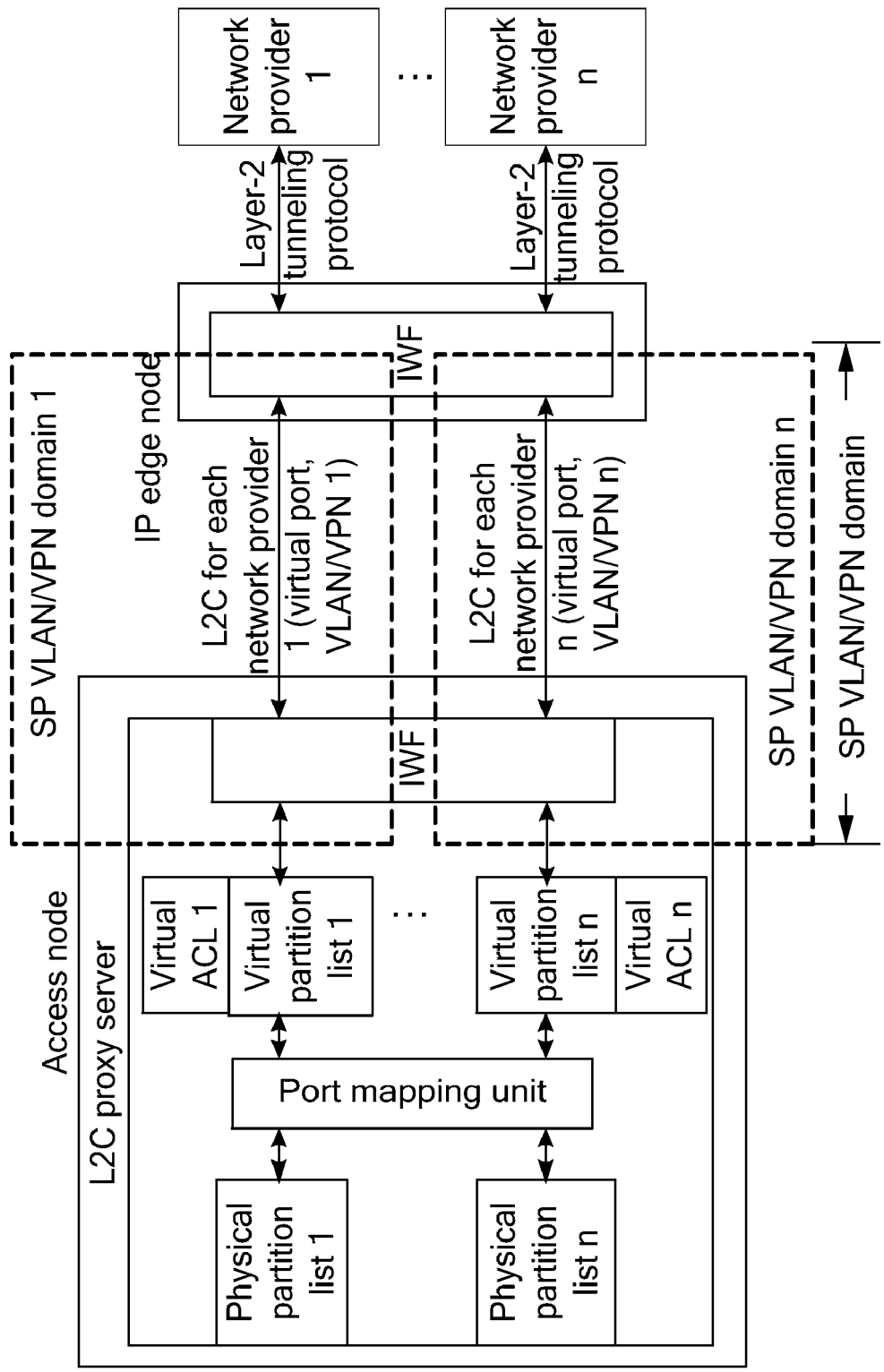
FIG. 15 shows a sixth service/SP handover scenario provided in an embodiment of the present invention.

The fourth method application scenario of the present invention is the fifth and sixth service/SP handover scenarios, as shown in FIG. 14 and FIG. 15. FIG. 14 and FIG. 15 differ from FIG. 10 in that: The L2C proxy is set inside a BNG/BRAS, as shown in FIG. 14; or set inside the access network, as shown in FIG. 15. The process is the same.

In conclusion, through the embodiments of the present invention, the service data can be configured dynamically in the access device and the SP system, and in particular, the port and the VLAN/VPN attribute corresponding to each SP system can be configured dynamically. Through the embodiments described above, when a nomadic user roams to a remote network and wants to access the service of the home SP system, the nomadic user dynamically obtains the information about the mapping relation between the VLAN/VPN network attribute of the home SP system and the access port through the L2C function, thus overcoming the incapability of accessing the home SP system in the prior art. In the embodiments of the present invention, when a user is handed over from an SP system to a new SP system, the user dynamically obtains the information about the mapping relation between the access port and the VLAN/VPN network attribute of the new SP system through the L2C function, and thus is handed over to the new SP system smoothly.

The above descriptions are merely exemplary embodiments of the present invention, but not intended to limit the scope of the present invention. Any modifications, variations or replacement that can be easily derived by those skilled in the art should fall within the scope of the present invention. Therefore, the scope of protection of the present invention is subject to the appended claims.

What is claimed is:

1. A dynamic virtual network configuration method, comprising:

by a serving edge device, in the process of a user handover from a current virtual network to a target virtual network, obtaining a target virtual network identifier and a corresponding interface identifier, using the target virtual network identifier and the corresponding interface identifier of the interface accessed by the user, to generate a Layer-2 Control (L2C) protocol packet, and sending out the L2C protocol packet; and by a communication proxy device that receives the L2C protocol packet, obtaining the target virtual network identifier and the corresponding interface identifier from the L2C protocol packet, and setting up a mapping relation between a target virtual network and an interface;

wherein the process of setting up the mapping relation between the target virtual network and the interface comprises:

by the communication proxy device, dynamically deleting a physical interface identifier corresponding to the interface identifier from a physical interface partition list corresponding to a current virtual network identifier; and adding the physical interface identifier to a physical interface partition list corresponding to the target virtual network identifier; or by the communication proxy device, dynamically deleting a virtual interface identifier corresponding to the interface identifier from a virtual interface partition list corresponding to a current virtual network identifier; and adding the physical interface to a physical interface partition corresponding to the target virtual network identifier.

2. The configuration method of claim 1, comprising:
by the serving edge device, in a process of authenticating a nomadic user, obtaining the target virtual network identifier corresponding to the nomadic user and the interface identifier of the interface accessed by the nomadic user; or
   by the serving edge device, when the user selects a target service and/or is re-authenticated, obtaining the target virtual network identifier selected by the user and the corresponding interface identifier; or
   by the serving edge device, when a target service provision device selects a target multicast virtual network for handover, obtaining the target virtual network identifier and the corresponding interface identifier.

3. The configuration method of claim 1,
wherein the communication proxy device and an access device are set in a same physical entity; or
   wherein the communication proxy device is set in an access convergence device; or
   wherein the communication proxy device and the serving edge device are set in a same physical entity.

4. The configuration method of claim 1,
wherein the interface is a physical port, and the information about the mapping relation between the target virtual network and the interface comprises the target virtual network identifier and a corresponding physical port identifier; or
   wherein the interface is a physical access circuit, and the information about the mapping relation between the target virtual network and the interface comprises the target virtual network identifier and a corresponding physical access circuit identifier; or
   wherein the interface is a virtual port, and the information about the mapping relation between the target virtual network and the interface comprises a virtual target virtual network identifier and a corresponding virtual port identifier; or comprises the virtual target virtual network identifier and the corresponding information about the mapping relation between the virtual port and the physical port; or
   wherein the interface corresponding to the access device is a virtual access circuit, and the information about the mapping relation between the target virtual network and the interface comprises the virtual target virtual network identifier and a corresponding virtual access circuit identifier; or comprises the virtual target virtual network identifier and the corresponding information about the mapping relation between the virtual port and the physical port, wherein the virtual network may be a Virtual Local Area Network (VLAN) or a Virtual Private Network (VPN).

5. A communication proxy apparatus, comprising:
a receiving unit, adapted to receive a Layer-2 Control (L2C) protocol packet that carries a target virtual network identifier and a corresponding interface identifier in the process of a user handover from a current virtual network to a target virtual network;
an obtaining unit, adapted to parse the L2C protocol packet to obtain the target virtual network identifier and the corresponding interface identifier from the packet;
a storing unit, adapted to: store information about a mapping relation between an interface and a virtual network, wherein the information about the mapping relation comprises the virtual network identifier and the interface identifier of the interface accessed by the user; and
a configuring unit, adapted to modify the information about the mapping relation in the storing unit according to the obtained target virtual network identifier and the corresponding interface identifier;
wherein the storing unit records at least one mapping relation partition information unit, and each mapping relation partition information unit corresponds to a virtual network, and records the virtual network identifier and the corresponding interface partition information; and
wherein the configuring unit deletes interface information corresponding to the interface identifier of the interface accessed by the user, from the mapping relation partition information unit corresponding to a current virtual network identifier, and adds the interface information corresponding to the interface identifier of the interface accessed by the user, to the mapping relation partition information unit corresponding to the target virtual network identifier;
wherein the interface is a physical interface, and the mapping relation partition information unit records a virtual network identifier and the corresponding physical interface information; or
wherein the interface is a virtual interface, and the mapping relation partition information unit records a logical virtual network identifier and the corresponding mapping relation between the virtual interface and the physical interface.

6. The communication proxy apparatus of claim 5, further comprising:
a port mapping unit, adapted to perform conversion between the physical interface and the virtual interface for the received packet according to the information about the mapping relation between the physical interface and the virtual interface.

7. The communication proxy apparatus of claim 5, further comprising:
a matching unit, adapted to: check whether the target virtual network identifier matches a current virtual network identifier; and, if they do not match, notify the configuring unit to start configuration.

* * * * *